Patented Aug. 17, 1954

2,686,759

UNITED STATES PATENT OFFICE 2,686,759

OIL COMPOSITIONS CONTAINING WAX-ALKYLATED STYRENE-ISOPRENE COPOLYMERS

John J. Giammaria, Woodbury, N. J., assignor to Socony-Vacuum Oil Company, Incorporated, a corporation of New York No Drawing. Application March 27, 1952, Serial No. 278,951

4 Claims. (Cl. 252—59)

This invention relates generally to improved lubricating oil compositions. More particularly, it relates to lubricating oil compositions containing wax-alkylated styrene-isoprene copolymers as pour point depressants.

The alkylation of certain resinous polymeric materials, such as polystyrene, benzene-ethylenedichloride copolymers and phenol-formaldehyde resins, with alkyl halides, including chlorinated paraffin wax, whereby the resins are made oil-soluble has been shown in U. S. Patent No. 2,072,120, issued March 2, 1937, to L. A. Mikeska et al. This patent further discloses that the alkylated resins therein described possess ability as viscosity index improvers. However, there is no teaching that these alkylated resins, or other styrene copolymer resins, such as the particular styrene-isoprene resin herein contemplated could be alkylated to produce oil-soluble products having exceptional ability as pour point depressants in lubricating oils.

In accordance with the present invention, it has been found that a resinous copolymer of styrene and isoprene, specifically a copolymer comprising about 75 weight per cent of styrene and 25 weight per cent of isoprene, may be alkylated with chlorinated paraffin wax under certain specified conditions, hereinafter defined, to give products which are highly effective pour depressants.

As far as is known, the wax-alkylated styrene-isoprene copolymers herein contemplated have not been made heretofore and they are, therefore, considered to be new compositions of matter.

It is, therefore, an object of this invention to provide a new class of wax-alkylated copolymer products as well as a method for their preparation. It is a further object to provide mineral lubricating oils of low pour point, such oil compositions containing minor amounts of the wax-alkylated styrene-isoprene copolymer herein contemplated. Other objects will appear from the following description of the invention.

As aforesaid, the styrene-isoprene copolymer ultilized herein comprises approximately 75 weight per cent styrene and 25 weight per cent isoprene. This copolymer is available commercially from the Union Bay State Chemical Company of Cambridge, Mass., under the name "Isopol Resin P-114-RM." This copolymer is a water-white, glassy resin having a molecular weight of approximately 2300 and an iodine number of 100. It is soluble in aromatic hydrocarbons, chlorinated hydrocarbons, esters and ketones.

In accordance with the invention, the styrene-isoprene copolymer is alkylated with a chlorinated paraffin wax containing from 10 to 12 per cent by weight of chlorine. Although the copolymer may be alkylated with a chlorowax of lower or higher chlorine content, it has been found that the only products which are significantly effective as pour depressants are those prepared from a chlorowax containing 10 to 12 per cent chlorine. It has been found further that the effectiveness of the alkylated product as a pour depressant depends upon the amount of chlorinated wax used in the alkylation reaction, the most effective products being those obtained by the use of an amount of chlorinated wax sufficient to provide from 2 to 4 atoms (atomic weights) of chlorine for each benzene ring (i. e. mol of styrene) in the copolymer.

Additionally, the effectiveness of the product is affected by the solvent medium, the temperature and the amount of Friedel-Crafts catalyst utilized in carrying out the alkylation reaction. Thus, it is necessary that the reaction be conducted in the presence of a polychlorinated aliphatic hydrocarbon as a solvent medium, at a temperature of from about 80° C. to about 100° C. and for a time required to effect the condensation under these conditions, viz., from about 5 to about 7 hours. The reaction temperature is conveniently controlled by selecting a polychlorinated hydrocarbon solvent having a boiling point suitable for the reaction, i. e., of from 80° C. to 100° C. and conducting the reaction at the reflux temperature of the solvent. A particularly suitable solvent is ethylene dichloride. However, other polychlorinated hydrocarbon solvents may be used, for example, dichloroethylene and tetrachloroethane. The use of approximately 3 per cent by weight of AlCl$_3$ catalyst, based on the combined weight of copolymer and chlorowax used, provides the best products. Under these conditions, side reactions are apparently held to a minimum and good yields of the desired products are obtained. The use of a non-chlorinated hydrocarbon solvent, for example, does not yield effective products when either high or low temperatures are used. See Examples M and N.

The following examples and test results will serve to illustrate the utility of the products contemplated herein as pour depressants and also the specificity of the reactants and reaction conditions required to provide these pour depressant products.

The chlorinated wax utilized in the examples was prepared by simply melting a paraffin wax having a melting point of 120–130° F. and then passing chlorine through the melted wax at a temperature of about 200° F. until the desired amount of chlorine had been taken up by the wax.

In the examples, the parenthetical suffixes, such as the suffix (2–8) in Example A, define the ratio of the number of atomic proportions of chlorine in the chlorowax reactant used to the mols of styrene in the copolymer (2) and the percentage of chlorination of the chlorowax (8).

EXAMPLE A

*Wax-alkylated copolymer (2–8)*

Twenty-five grams of a 75 per cent styrene-25 per cent isoprene copolymer were dissolved in 200 cc. of ethylene dichloride. One hundred and sixty grams of chlorinated wax containing 8.0 per cent chlorine by weight were added and the solution was gradually heated. (The wax which was chlorinated was a scale wax of 126–128° F. melting point.) At 70° C., 5.5 grams of anhydrous $AlCl_3$ were added in small portions over a 15–20 minute period. After the addition was completed, the temperature was raised to 87° C. and the mixture was heated under reflux for 7 hours. The reaction mixture was cooled, washed with hot water until free of aluminum and filtered. The solvent was removed by distillation to obtain the alkylated copolymer.

EXAMPLE B

*Wax-alkylated copolymer (2–10)*

Twenty-five grams of copolymer similar to that described in Example A, 128.0 grams of 10.0 per cent chlorinated wax and 4.6 grams of anhydrous $AlCl_3$ in 200 cc. of ethylene dichloride were reacted as described in Example A.

EXAMPLE C

*Wax-alkylated copolymer (4–10)*

Nineteen grams of styrene-isoprene copolymer, 197.0 grams of 10.0 per cent chlorinated wax and 6.5 grams of $AlCl_3$ in 200 cc. of ethylene dichloride were reacted as described in Example A.

EXAMPLE D

*Wax-alkylated copolymer (1–12)*

Twenty-five grams of styrene-isoprene copolymer, 53.4 grams of 12.0 per cent chlorinated wax and 2.3 grams of $AlCl_3$ in 200 cc. of ethylene dichloride were reacted as described in Example A.

EXAMPLE E

*Wax-alkylated copolymer (2–12)*

Twenty-five grams of styrene-isoprene copolymer, 106.0 grams of 12.0 per cent chlorinated wax and 4.0 grams of anhydrous $AlCl_3$ in 200 cc. of ethylene dichloride were reacted as described in Example A.

EXAMPLE F

*Wax-alkylated copolymer (3–12)*

Twenty-five grams of styrene-isoprene copolymer, 160.0 grams of 12.0 per cent chlorinated wax and 5.55 grams of $AlCl_3$ in 200 cc. of ethylene dichloride were reacted as described in Example A.

EXAMPLE G

*Wax-alkylated copolymer (4–12)*

Fifteen grams of styrene-isoprene copolymer, 130.0 grams of 12.0 per cent chlorinated wax and 4.4 grams of anhydrous $AlCl_3$ in 200 cc. of ethylene dichloride were reacted as described in Example A.

EXAMPLE H

*Wax-alkylated copolymer (1–14)*

Twenty-five grams of styrene-isoprene copolymer, 45.0 grams of 14.0 per cent chlorinated wax and 2.1 grams of $AlCl_3$ in 200 cc. of ethylene dichloride were reacted as described in Example A.

EXAMPLE I

*Wax-alkylated copolymer (2–14)*

Seventeen grams of styrene-isoprene copolymer, 61.0 grams of 14.0 per cent chlorinated wax and 2.3 grams of $AlCl_3$ in 200 cc. of ethylene dichloride were reacted as described in Example A.

EXAMPLE J

*Wax-alkylated copolymer (3–14)*

Twenty-five grams of styrene-isoprene copolymer, 150.0 grams of 14.0 per cent chlorinated wax and 5.2 grams of anhydrous $AlCl_3$ in 200 cc. of ethylene dichloride were reacted as described in Example A.

EXAMPLE K

*Wax-alkylated copolymer (3–12)*

Twenty-five grams of styrene-isoprene copolymer, 160.0 grams of 12.0 per cent chlorinated wax and 5.55 grams of $AlCl_3$ in 200 cc. of ethylene dichloride were reacted as described in Example A.

EXAMPLE L

*Wax-alkylated copolymer (3–12)*

Twenty-five grams of styrene-isoprene copolymer, 160.0 grams of 12.0 per cent chlorinated wax and 1.85 grams of $AlCl_3$ in 200 cc. of ethylene dichloride were reacted as described in Example A.

EXAMPLE M

*Wax-alkylated copolymer (3–12)*

Twenty-five grams of styrene-isoprene copolymer, 160.0 grams of 12.0 per cent chlorinated wax and 5.55 grams of $AlCl_3$ in 200 cc. of n-heptane were reacted as described in Example A.

EXAMPLE N

*Wax-alkylated copolymer (3–14)*

Twenty-five grams of styrene-isoprene copolymer, 134.0 grams of 14.0 per cent chlorinated wax and 4.77 grams of $AlCl_3$ in 200 cc. of a high boiling, highly acid-treated, petroleum solvent (ink oil) were reacted as described in Example A, except that a temperature of 125–150° C. was used.

EXAMPLE O

*Wax-alkylated copolymer (3–16)*

Twenty-five grams of styrene-isoprene copolymer, 120.0 grams of 16.0 per cent chlorinated wax and 4.3 grams of anhydrous $AlCl_3$ in 200 cc. of ethylene dichloride were reacted as described in Example A.

POUR POINT DEPRESSION

Oil blends of the wax-alkylated copolymer products of the foregoing examples were prepared and subjected to A. S. T. M. pour tests. The results of these tests are shown in the accompanying table. The base oil used was a Duo-Sol refined, Mid-continent type base oil having a kinematic viscosity of 12.2 centistokes at 210° F. and an A. S. T. M. pour point of +20° F. For ready comparison, the table also shows the alkylating conditions utilized in the preparation of each of the wax-alkylated copolymers. The data in the table clearly illustrate the critical effects of the alkylating conditions used. Thus, the effect of the degree of chlorination of the wax, other conditions being constant, is illustrated in Examples A, B, E and I; Examples B and E, in which a 10 and a 12 per cent chlorinated wax was used, showing excellent pour depressing ability and Examples A and I, in which 8 and 14 per cent chlorinated wax was used, respectively, giving poor results. Also, compare Example F with Examples J and O.

The effect of the ratio of the atoms of chlorine in the chlorowax to the mols of styrene in the copolymer, i. e., the degree of substitution of wax in the copolymer, is illustrated by Examples D, E, F and G. Thus, Example D, which utilized a ratio of 1, gave poor results, while Examples E, F and G, which utilized ratios of 2, 3 and 4, respectively, all gave excellent results. Similarly, Example H, which used a ratio of 1 gave poor results, while Examples I and J, which utilized ratios of 2 and 3, respectively, gave good results.

The effect of using a different solvent than a chlorinated hydrocarbon is illustrated by comparing the results obtained in Examples K and J with that in Examples M and N, respectively. Thus, with acid-treated ink oil (a hydrocarbon solvent) a higher reaction temperature was required to obtain reaction and the product was relatively ineffective as a pour depressant.

Comparison of the results provided by the products of Examples K and L shows that the use of approximately 3 per cent of the AlCl₃ catalyst gives superior results.

The proportion of additive to be incorporated in a lubricating oil will vary with the oil and with the improvement desired. Thus, concentrations of 0.01 to 10.0 per cent may be used although the desired results are generally obtained with concentrations of 0.1 to 2.0 per cent by weight.

Instead of placing the products of this invention directly in the lubricating oil in which they are to be finally used, they may be marketed as concentrates containing, e. g., 10 per cent to 50 per cent by weight of the product.

The products of this invention may be blended in lubricating oils containing other additives such as other types of pour point depressants and viscosity index improvers, detergents, anti-oxidants, anti-foam agents, etc.

What is claimed is:

1. A mineral lubricating oil containing a minor amount, sufficient to depress the pour point of said oil, of the product formed by alkylating a styrene-isoprene copolymer, comprising approximately 75 weight per cent of styrene and the remainder isoprene, with an amount of chlorinated paraffin wax containing from 10 to 12 weight per cent of chlorine, to supply to the reaction from 2 to 4 atomic proportions of chlorine per mol of styrene in said copolymer in a polychlorinated hydrocarbon solvent having a boiling point of from about 80° C. to about 100° C., at the reflux temperature of said solvent, for a time period of from 5 to 7 hours and in the presence of approximately 3 per cent by weight of aluminum chloride as catalyst based on the combined weight of the chlorinated wax and copolymer used in the reaction.

2. A mineral lubricating oil containing a minor amount, sufficient to depress the pour point of said oil, of the product formed by alkylating a styrene-isoprene copolymer, comprising approximately 75 weight per cent of styrene and the remainder isoprene, with an amount of chlorinated paraffin wax containing from 10 to 12 weight per cent chlorine, to supply to the reaction from 2 to 4 atomic proportions of chlorine per mol of styrene in said copolymer, in a solvent consisting of ethylenedichloride, at the reflux temperature of said solvent, for a time period of from 5 to 7 hours and in the presence of approximately 3 per cent by weight of aluminum chloride as catalyst based on the combined weight of the chlorinated wax and copolymer used in the reaction.

3. As a new composition of matter, the product formed by alkylating a styrene-isoprene copolymer, comprising approximately 75 weight per cent of styrene and the remainder isoprene, with an amount of chlorinated paraffin wax containing from 10 to 12 weight per cent of chlorine, to supply to the reaction from 2 to 4 atomic proportions of chlorine per mol of styrene in said copolymer, in a polychlorinated hydrocarbon solvent having a boiling point of from about 80° C. to about 100° C., at the reflux temperature of said solvent, for a time period of from 5 to 7 hours and in the presence of approximately 3 per cent by weight of aluminum chloride as catalyst based on the combined weight of the chlorinated wax and copolymer used in the reaction.

4. As a new composition of matter, the product formed by alkylating a styrene-isoprene copolymer, comprising approximately 75 weight per cent of styrene and the remainder isoprene, with

| Wax-Alkylated Copolymer Blended in Oil | Reaction Conditions | | | | | A. S. T. M. Pour Point, ° F. | |
|---|---|---|---|---|---|---|---|
| | Chlorine-Styrene Ratio [1] | Chlorine in Wax (Wgt. Per-cent) | AlCl₃ (Wgt. Per-cent) [2] | Solvent | Temp., ° C. | 0.25% | 0.1% |
| Example A | 2 | 8 | 3.0 | Ethylene Dichloride | 87 | 0 | +20 |
| Example B | 2 | 10 | 3.0 | ----do---- | 87 | −25 | 0 |
| Example C | 4 | 10 | 3.0 | ----do---- | 87 | −20 | 0 |
| Example D | 1 | 12 | 3.0 | ----do---- | 87 | +5 | |
| Example E | 2 | 12 | 3.0 | ----do---- | 87 | −30 | −15 |
| Example F | 3 | 12 | 3.0 | ----do---- | 87 | −20 | −10 |
| Example G | 4 | 12 | 3.0 | ----do---- | 87 | −20 | −15 |
| Example H | 1 | 14 | 3.0 | ----do---- | 87 | +20 | |
| Example I | 2 | 14 | 3.0 | ----do---- | 87 | +5 | |
| Example J | 3 | 14 | 3.0 | ----do---- | 87 | −10 | +5 |
| Example K | 3 | 12 | 3.0 | ----do---- | 87 | −15 | −10 |
| Example L | 3 | 12 | 1.0 | ----do---- | 87 | +20 | |
| Example M | 3 | 12 | 3.0 | n-heptane | 87 | +20 | |
| Example N | 3 | 14 | 3.0 | Acid-treated Ink Oil | 125–150 | +20 | |
| Example O | 3 | 16 | 3.0 | Ethylene Dichloride | 87 | 0 | |

[1] Atomic proportions of chlorine in chlorinated wax to mols of styrene in copolymer.
[2] Weight percent of chlorinated wax and copolymer.

mer, comprising approximately 75 weight per cent of styrene and the remainder isoprene, with an amount of chlorinated paraffin wax containing from 10 to 12 weight per cent of chlorine, to supply to the reaction from 2 to 4 atomic proportions of chlorine per mol of styrene in said copolymer, in a solvent consisting of ethylenedichloride, at the reflux temperature of said solvent, for a time period of from 5 to 7 hours and in the presence of approximately 3 per cent by weight of aluminum chloride as catalyst based on the combined weight of the chlorinated wax and copolymer used in the reaction.

References Cited in the file of this patent

FOREIGN PATENTS

| Number | Country | Date |
|---|---|---|
| 640,566 | Great Britain | July 26, 1950 |